(12) United States Patent
Fattouche

(10) Patent No.: US 6,799,051 B1
(45) Date of Patent: Sep. 28, 2004

(54) IDENTIFICATION SYSTEM FOR MOBILE TRANSCEIVERS

(76) Inventor: Michel T. Fattouche, 3627 Utah Dr., N.W., Calgary, Alberta (CA), T2N 4A6

(*) Notice: Subject to any disclaimer, the term of this patent is extended or adjusted under 35 U.S.C. 154(b) by 848 days.

(21) Appl. No.: 09/718,099

(22) Filed: Nov. 22, 2000

(51) Int. Cl.$^7$ .................................................. H04Q 7/20
(52) U.S. Cl. ............................... 455/456.2; 455/404.2; 340/10.3; 340/825.49
(58) Field of Search .................... 455/414.2, 404.1, 455/404.2, 456.1, 456.2, 456.3, 456.5, 456.6, 458, 67.11, 459, 67.16, 466; 370/352, 353; 342/47, 51, 357.01, 357.03, 357.07, 357.08, 357.09, 357.1, 357.5, 359; 340/10.1, 10.3, 10.4, 10.42, 505, 825.54, 539, 13, 539.32, 825.49, 992, 993

(56) References Cited

U.S. PATENT DOCUMENTS 5,901,352 A * 5/1999 St-Pierre et al. ......... 455/426.1
6,181,253 B1 * 1/2001 Eschenbach et al. ... 340/825.37
6,198,917 B1 * 3/2001 Taylor et al. ............... 455/417
6,208,866 B1 * 3/2001 Rouhollahzadeh et al. ....................... 455/456.5
6,441,752 B1 * 8/2002 Fomukong .................. 340/988
6,463,289 B1 * 10/2002 Havinis et al. .......... 455/456.4

* cited by examiner

Primary Examiner—Jean Gelin
(74) Attorney, Agent, or Firm—Anthony R. Lambert

(57) ABSTRACT

A method of identifying a target mobile transceiver in a communications network that includes multiple unknown mobile transceivers. In this aspect of the method, a location system interrogates the target mobile transceiver multiple times in an interrogation pattern to cause the target mobile transceiver to transmit a signal in response to each interrogation. The location system monitors signals transmitted by all mobile transceivers in the network, and identifies the target mobile transceiver as the mobile transceiver whose pattern of response most closely matches the interrogation pattern.

7 Claims, 1 Drawing Sheet

IDENTIFICATION SYSTEM FOR MOBILE TRANSCEIVERS

FIELD OF THE INVENTION

This invention relates to systems for locating mobile transceivers.

BACKGROUND OF THE INVENTION

In order to locate a target mobile transceiver in the coverage area of a communications network, it is necessary for a location system to be able to detect a signal transmitted from the target mobile transceiver. The location system uses measurements of the signal transmitted by the target mobile transceiver such as the time of arrival (TOA) to locate the mobile transceiver. In a system where there are many mobile transceivers and the location system does not have access to identification codes used within the communications network to identify the mobile transceivers, this problem becomes difficult. The location network may know the call sign or telephone number allocated to the mobile transceiver, and thus be able to call the mobile transceiver. However, the location system does not necessarily know which of the many signals being transmitted within the communications network by multiple unknown mobile transceivers corresponds to the transmissions of the target mobile transceiver. The location system requires some way to identify signals transmitted by the target mobile transceiver and differentiate those signals from all other signals being used by other mobile transceivers in the communications system. This invention provides a solution to this problem.

SUMMARY OF THE INVENTION

In one aspect, this invention provides a method of identifying a target mobile transceiver in a communications network that includes multiple unknown mobile transceivers. In this aspect of the method, a location system interrogates the target mobile transceiver multiple times in an interrogation pattern to cause the target mobile transceiver to transmit a signal in response to each interrogation. The location system monitors signals transmitted by mobile transceivers in at least a portion of the network, and identifies the target mobile transceiver as the mobile transceiver whose pattern of response exceeds a matching threshold and most closely matches the interrogation pattern.

Preferably, to avoid computational overload, signals are monitored in a portion of the network, and, upon failure of any monitored signals to exceed the matching threshold, signals transmitted by mobile transmitters are monitored in another portion of the network. In addition, to assist in avoiding false positives, monitoring may be limited to a monitoring interval immediately following the interrogation.

In a further aspect of the invention, upon identifying the target mobile transceiver, information is generated that specifies the location of the target mobile transceiver. The step of interrogating may be initiated after a request from a requester and the location information generated is provided to the requestor.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
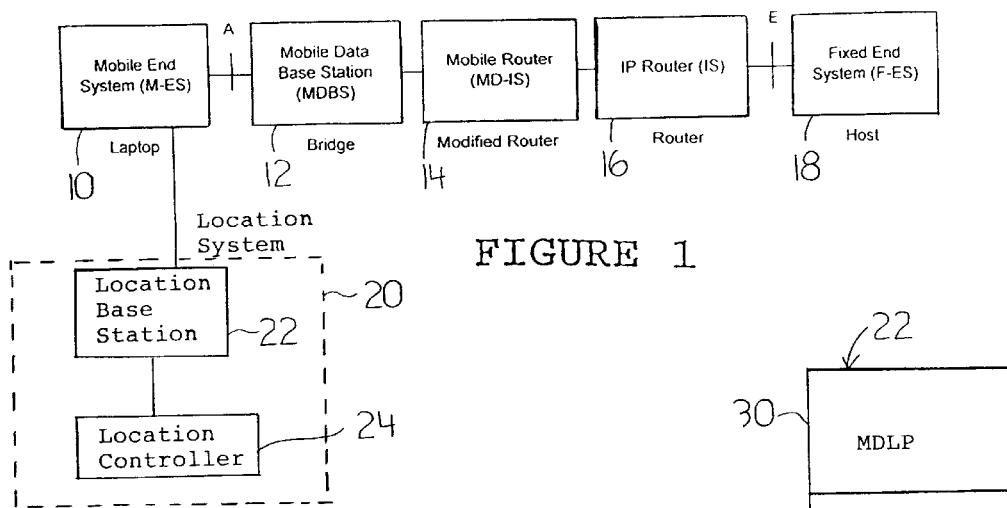
FIG. 1 shows a typical CDPD system in combination with a location system according to the invention.

In this patent document, "comprising" means "including". In addition, a reference to an element by the indefinite article "a" does not exclude the possibility that more than one of the element is present.

An exemplary embodiment of the invention will be described in relation to a Cellular Digital Packet Data system defined in accordance with the Cellular Digital Packet Data System Specification, Release 1.1, CDPD Forum, 19 Jan. 1995. However, the invention is of general application and can be used in association with any communication system in which it is possible to interrogate a target mobile transceiver.

The CDPD system was designed with the goal of making snooping on its users as difficult as possible. Thus, the system design included features such as the use of Temporary Equipment Identifiers (TEIs) so that the unique Equipment ID (EID) assigned to each mobile transceiver would never have to be broadcast in the clear. The design also included a powerful (at the time) 128 bit encryption key and the use of Public Key techniques to exchange and deliver cryptographic key updates. In addition, other system features not intended as security features such as frequency hopping make the system hard to monitor and locate individual users.

Locating a CDPD mobile transceiver without the ability to decode and decrypt the signal is difficult. Other than the link establishment portion of the network registration messages, all traffic on the CDPD network is encrypted using up to a 128 bit key. Each call or session on the CDPD network uses a unique key, so that every time a mobile transceiver registers a new key is used. This key can also be changed periodically (every few hours) even if the unit does not move. Locating a CDPD mobile transceiver is further complicated by the fact that that in some networks, the channel streams frequency hop to avoid AMPS calls. This takes place at a rate of 5 to 60 seconds, so it is very slow when compared to other digital cellular networks. While most CDPD networks in the US no longer use this frequency-hopping mode, it is possible that some networks may still choose to use it, making it a requirement on the location system.

The approach to target mobile transceiver identification described here does not involved modification of equipment used in the CDPD system but instead interrogates the target mobile transceiver multiple times and attempts to discover its TEI independently. The basis of this approach is to send ICMP Echo (i.e. Ping) requests to the target mobile transceiver and then search for responses with the correct message length. In order to correlate to the target mobile transceiver a number of interrogations are required so that the correct TEI is identified. Ater the first location (and resulting acquisition of the TEI) subsequent acquisitions would only require a single ping response since the position information can be correlated to a single (known) TEI until the TEI is changed.

To commence the location process, the location system first receives a location request from a user. The user could be the target mobile transceiver itself. Many location systems are known or described in the art for locating mobile transceivers and they need not be described here. The target mobile transceiver is initially identified by an equipment identifier, such as a telephone number, called the IP address. If the IP address or other equipment identifier is not known, the equipment identifier must be obtained from for example a lookup table that correlates such information that is available, for example a vehicle or personal name, with the equipment identifier.

Figure 3:
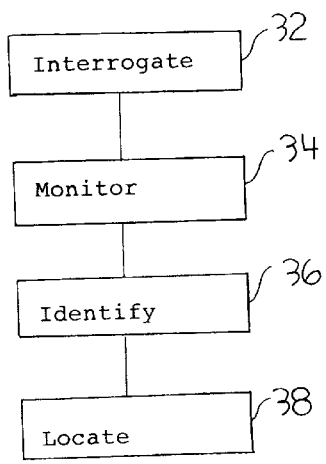
FIG. 3 is a flow diagram illustrating the steps used in an emobidment of the method of the invention.

As illustrated in FIG. 3, the location system initially interrogates the desired IP address N times (step 32). Interrogation in the CDPD case is carried out using a ping, with the location system acting as a ping client. The interrogation is carried out in a pattern, for example with alternating ping sizes - 3 bytes then 21 bytes. The location system then monitors traffic on the communications network (step 34) and looks for a pattern of signals having the same TEI and that match the alternating pattern of pings (step 36).

Subsequently, as long as the TEI has not changed, the location system can issue a limited number of Pings until a response is received from the target mobile receiver. The target mobile receiver can be identified by its TEI. In cases where the target mobile transceiver has to re-establish the data link layer and thus obtain a different TEI, the location system will repeat the interrogation.

Once a TEI corresponding to the target mobile transceiver is identified, the location system computes a location based for example on the received TOA data associated with the TEI of the target mobile transceiver, and reports the calculated position to the requester in accordance with known techniques (step 38).

Identification of the target mobile receiver from the pattern of responses to the interrogation is a statistical technique. Two values are of interest, false alarm rate and confidence. The false alarm rate and confidence may be calculated using an Excel™ spreadsheet using five inputs:

(1) probability that the target mobile transceiver responds to any given ping (within the search window - 2 seconds).

(2) the probability that a given other mobile transceiver will transmit something that looks like the right size, (3) the number of times the location system pings the target mobile transceiver (value N), (4) how many responses the location system needs to get to declare detection (value K), and (5) how many undesired transmitters are there in the same cell as the target mobile transceiver (or more precisely, in the area over which the location system searches for the target mobile transceiver, which will likely be more than one cell).

The confidence level is the probability of detecting at least K responses to N pings (where K and N are variables) from the target mobile transceiver (i.e., the probability of detection).

The false alarm rate is the probability that the location system will detect some other unit that appears to respond K times to the N pings inadvertently. Given the probability that any given, active transmitter will transmit a frame of the right length during the observation interval, the probability may be calculated that at least one of the active transmitters will appear to respond to the pings enough times for the location system to falsely declare that transmitter the target. It is possible that both the target mobile transceiver and other units will pass the threshold. Thus, to identify the target mobile transceiver, the signal transmission must both exceed a matching threshold and be the closest match of all transmissions that exceed the matching threshold.

Table 1 provides four potential scenarios calculated by an Excel spreadsheet. Scenario 2 is likely the most realistic with the probability of response set to 0.8, the probability of a same size packet from an undesired unit set to 0.1, and the number of undesired units responding same window suite set to 50. Under Scenario 2, the resulting confidence is greater than 90% and the False Alarm Rate is less than 0.02% with the number of attempts set to 12 threshold set to 8. These results seem acceptable with a unit being located within 60 seconds or less (assuming that the Ping rate is set at 5 seconds).

TABLE 1

Summary of False Alarm/Confidence Analysis

| Scenario | Probability of desired unit responding in window | Probability of one particular, undesired unit responding in the same window | Number of trials | Threshold of detection | No. of undesired, active transmitters in the same window | Confidence | False Alarm Rate |
| --- | --- | --- | --- | --- | --- | --- | --- |
| 1 | 0.85 | 0.15 | 5 | 4 | 10 | 0.8352100 | 0.0220530 |
| 2 | 0.8 | 0.1 | 12 | 8 | 50 | 0.9274445 | 0.0001707 |
| 3 | 0.8 | 0.15 | 20 | 14 | 75 | 0.9133075 | 0.0000034 |
| 4 | 0.6 | 0.2 | 12 | 7 | 100 | 0.6652086 | 0.3236718 |

The equipment required for a location system configured to detect a target mobile transceiver in a CDPD system will now be discussed.

The elements that make up a CDPD system consist of a mobile end system 10, mobile data station 12, mobile data intermediate system 14, intermediate system 16 and fixed end system 18 as shown in FIG. 1.

The Mobile-End System (M-ES) 10 is the subscriber device that provides access to the CDPD network. In the context of this technical reference, the M-ES 10 is typically comprised of a laptop computer with CDPD modem and application software. However, the M-ES can also be a telemetry device. The M-ES software can either be native IP or a package that supports the Hayes AT command set.

The Mobile-Data Base Station (MDBS) 12 is the interface between the 19.2 kbps wireless link of the M-ES 10, and the wired network that links the CDPD system with other networks. The connection between the M-ES 10 and the MDBS 12 is typically called the Airlink or "A" interface. The MDBS 12 informs the M-ES 10 of frequency changes much like the collision avoidance standards found in network protocols. From a network transport protocol perspective, the MDBS 12 acts as a bridge that simply relays messages from the router 14 to the M-ES 10 and vice versa.

The Mobile-Data Intermediate System (MD-IS) 14 routes the data between the M-ES 10 and the IS 16 and maintains the M-ES 10 home serving function.

The Intermediate System (IS) 16 is a node that transports data between the subnetworks. Frame relay, T1 or X.25 networks are used to carry the data.

The fixed End System (FES) 18 is the "host" end of the mobile connection. This could be a server for email or a corporate database that supports the mobile application. It is the final destination of the message sent from an M-ES 10. This connection between the F-ES 18 and the IS 16 is called the External or "E" interface.

As shown in FIG. 1, mobile communication is accomplished by assigning each M-ES 10 to a home MD-IS 12. Every time an M-ES 10 registers on the CDPD link, its location is stored by its home MD-IS 12. If the M-ES 10 is not in the geographic service area served by its home MD-IS 12, upon registering, its location is forwarded to its home MD-IS 12 by the MD-IS 12 serving the M-ES 10 current location. Each MD-IS 12 in the system maintains a database containing the location of each M-ES 10 that it has been assigned, and every visiting M-ES 10 from another home MD-IS 12 service area that is presently located in its service area.

A location system 20 must be able to generate pings or other forms of interrogation and synchronize detection of mobile transceiver transmissions with base stations 22 within the location system. The location system 20 uses conventional equipment in the location system controller 24 to generate ICMP Echo Requests periodically (once every 5 seconds) of two varying lengths. At the time the echo request is generated at the location system controller 24, the location base stations are synchronously requested to monitor traffic from multiple M-ES 10 within the CDPD system. Two alternating pings of 3 bytes and 21 bytes may be used to limit the possibility of false detects (i.e. matching packet sizes from other active TEIs). Synchronization with location base stations 24 must be maintained so that each base station 24 can limit its search window to within two seconds for each ping request (again to limit the possibility of false detects). Synchronized detection of transmitted signals at multiple base stations is a known art and need not be further described here.

In conventional manner, the location base station 22 determines the active CDPD channels within its receiving range. In the case of the CDPD system, the necessary channel information, which includes the current RF channel and the Adjacent RF Channels can be obtained by decoding the Cell Configuration Message being broadcasted by CDPD Base Stations 12 on the forward channel. Location base stations 22 can obtain this information by either decoding the message directly or by interfacing with a M-ES 10 that can provide this information.

Figure 2:
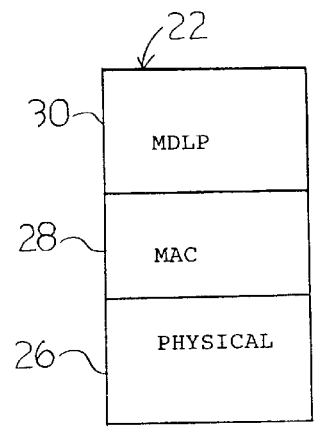
FIG. 2 is a block diagram showing components of a location base station used in the location system according to the invention.

As shown in FIG. 2, each location base station 22 incorporates the receive portions of the Physical Layer 26, MAC Layer 28 and the mobile link data protocol (MDLP) Layer 30 of a conventional CDPD system. This equipment has the ability to sense the state of the reverse channel for the presence of CDPD data transmissions and receive and decode reverse channel Reed-Solomon blocks. The location base station 22 also includes a conventional Link Layer Frame building unit for building link layer frames from the corresponding blocks received by the location base station and a conventional unit to decode the MDLP Header to determine the TEI and message type.

In operation during the monitoring step, the location base station 22 strips the MDLP Header and determine the number of bytes of information content for correlation with the expected size. The size of the Pings utilized should fit within a single MDLP frame. If the packet size is correct the TEI is stored by the location base station 22 or the location controller 24. The location system 20 keeps track of all the TEIs with the correct message length responses and will declare the desired TEI (and then perform a location determination) after receiving K responses to N attempts that match the interrogation pattern.

It is possible that the target mobile transceiver will not respond to pings because the service may be disabled, possibly for security reasons, or the target mobile transceiver may be in a sleep mode. CDPD Sleep is utilized by most CDPD mobile devices to improve battery life. In cases where a unit is in CDPD Sleep it will likely not respond to the interrogation within the search window. In such cases, it is desirable to synchronize the location system 20 with the CDPD System by interfacing with a M-ES 10 to obtain the sleep timing information (T204) for the CDPD network. Alternatively, it may be desirable to increase the search window and decrease the required responses (i.e. the K value), taking care not to cause too high a false detection probability and also too long of an acquisition. Typical T204 values are between 60 and 120 seconds.

To deal with a mobile environment, which may cause data packets to be dropped, the location system must be able to deal with an unreliable communication system. One way to alleviate unreliability of the communication system is to sen a number of packets (N) to the desired unit but only requiring a limited number (K) of responses. Also, the search may be spread over a long period to deal with units that are temporarily located in a poor RF environment. For example, it is recommended that the ping period is set to 5 seconds and the number of samples is set to 12 so that the search is over a 60 second duration.

It is desirable to limit the possibility of having a false detection where the search leads to multiple TEIs instead of a single TEI. This will happen if a mobile transceiver other than the target mobile transceiver happens to be transmitting with the same size packet and with the search period. To limit this possibility it is recommended that a number of samples be used with an alternating ping packet size. The ping packets used should fit within a single MDLP Frame. Furthermore, one of the ping packets should be an unlikely small size (i.e. 3 bytes) with the second packet slightly larger (i.e. 21 bytes). Another technique to limit the possibility of a false detect, is to limit the response window (e.g. to 2 seconds) and ignore packets received outside of this window. Thus, the technique would be to ping with a 3 byte packet then search for 2 seconds for packets with the correct size then wait 3 seconds and then ping with a 21 byte packet and search for 2 seconds (repeat for a total of 12 samples - 60 seconds).

The portion of the communications network to be monitored may be limited by using various techniques that estimate the general location of the target mobile transceiver, and thus the location system need only initially monitor a small area of the communications network in a first attempt to locate the target mobile transceiver. For example, if the target mobile transceiver has been located in the recent past, then it may be assumed that the target mobile transceiver could not have moved more than a certain distance from its previous location. For another example, if a home location for the target mobile transceiver is known, then an initial search may be limited to an area immediately adjacent to and including the home location. If it is concluded that no transmissions reach a matching threshold in a given time period, for example 2 seconds, then the search can be expanded beyond the initial monitoring area into adjacent areas, and eventually through the entire network.

Immaterial modifications may be made to the invention described here without departing from the essence of the invention.

The Embodiments of the Invention in which an Exclusive Property or Privilege is Claimed are Defined as Follows:

1. A method of identifying a target mobile transceiver in a communications network that includes multiple unknown mobile transceivers, the method comprising the steps of:

interrogating the target mobile transceiver multiple times in an interrogation pattern to cause the target mobile transceiver to transmit a signal in response to each interrogation;

monitoring signals transmitted by mobile transceivers in at least a portion of the communications network; and identifying the target mobile transceiver as the mobile transceiver whose pattern of response exceeds a matching threshold and most closely matches the interrogation pattern.

2. The method of claim 1 in which signals are monitored in a portion of the network, and the method further comprising the step of, upon failure of any monitored signals to exceed the matching threshold, monitoring signals transmitted by mobile transmitters in another portion of the network.

3. The method of claim 1 in which monitoring is limited to a monitoring interval immediately following the interrogation.

4. The method of claim 1 further comprising the step of, upon identifying the target mobile transceiver, generating information specifying the location of the target mobile transceiver.

5. The method of claim 4 in which the step of interrogating is initiated after a request from a requestor and the location information generated in claim 4 is provided to the requestor.

6. The method of claim 5 in which signals are monitored in a portion of the network, and the method further comprising the step of, upon failure of any monitored signals to exceed the matching threshold, monitoring signals transmitted by mobile transmitters in another portion of the network.

7. The method of claim 6 in which monitoring is limited to a monitoring interval immediately following the interrogation.

* * * * *